Patented May 9, 1933

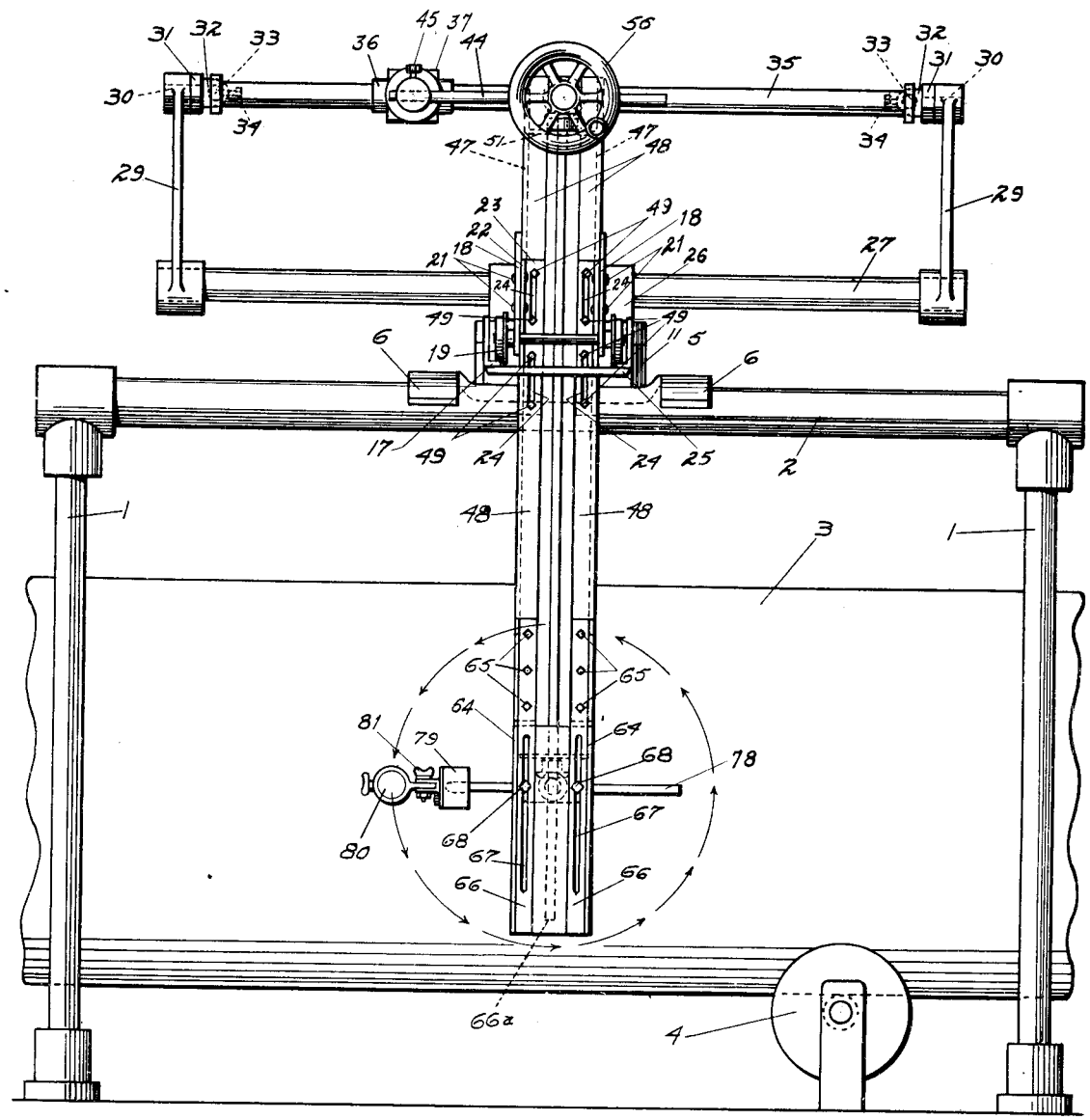

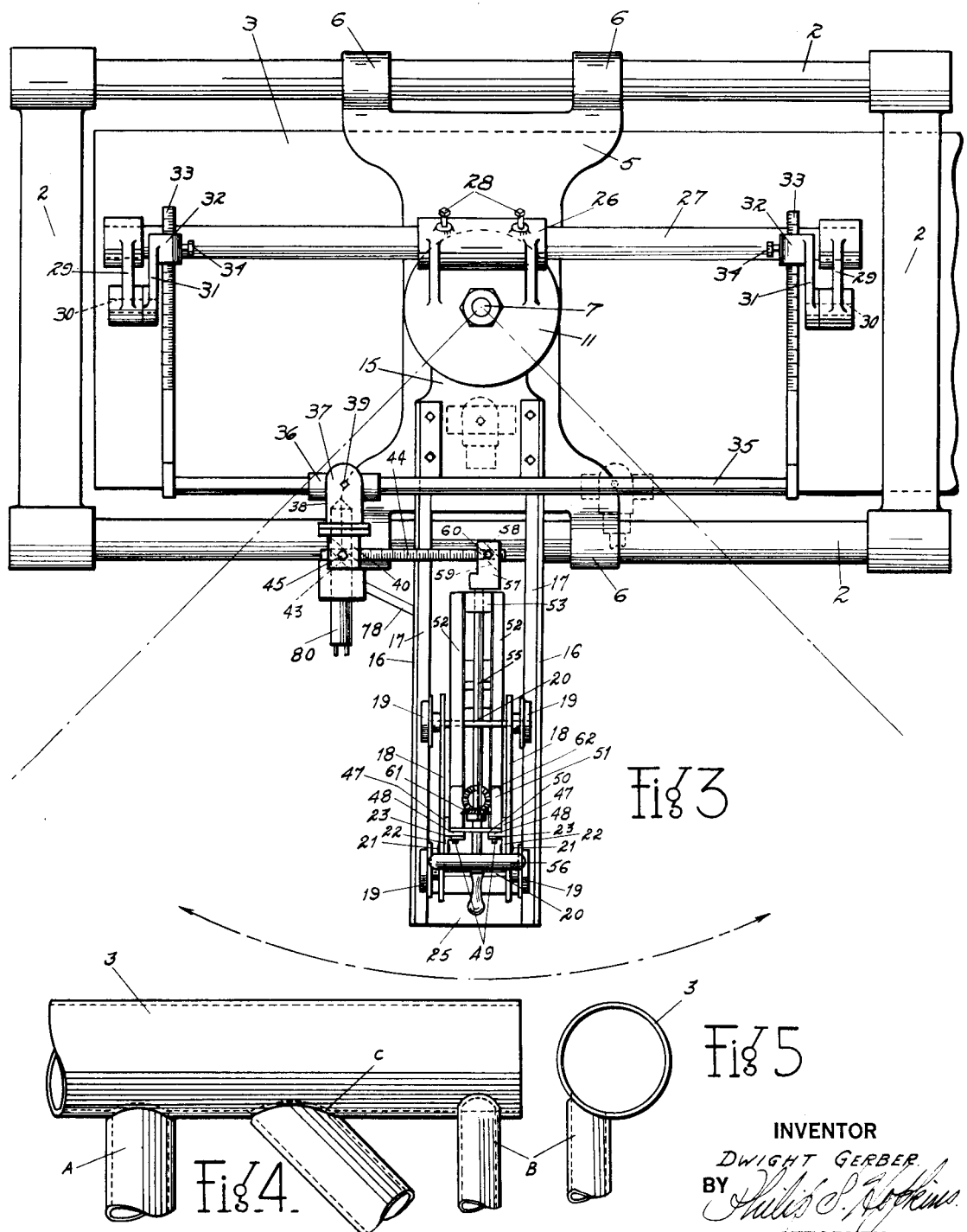

1,907,956

UNITED STATES PATENT OFFICE

DWIGHT GERBER, OF PITTSBURGH, PENNSYLVANIA

CYLINDER AND PIPE CUTTING MACHINE

Application filed May 15, 1931. Serial No. 537,673.

My invention relates to cylinder or pipe cutting machines and particularly to machines of this character adapted to cut openings in the cylindrical surfaces of pipes or cylinders for intersections with the ends of other pipes or cylinders of equal or different sizes preparatory to the joining and subsequent welding of the same together in such intersecting relation.

My invention is particularly useful in connection with cutting openings in both cylindrical and plane surfaces for receiving the ends of intersecting pipes or cylinders, and for purposes of illustration and invention will be described as applied to apparatus for cutting pipes and plane surfaces.

Cutting machines of various types and characters have been designed and used heretofore for this purpose, but for the most part have been unsatisfactory because of the time required for their use and the manual work and calculations necessary to properly execute work therewith. The primary object of my invention is to provide a composite machine which will, with a few simple settings, and adjustments, automatically describe the line of cut incident to the size of pipe involved and whether the intersection is to be on center or off center, at right angles, or other than right angles. This eliminates the old method of mathematically plotting the desired intersection, making a template therefor, scribing the line on the pipe, fixing the scribed line with pricked punches, etc. and finally following the line with a torch either manually or guided by some pantograph mechanism.

Another and important object of my invention is to provide a machine of this character which upon making the proper simple adjustments will rapidly, evenly, and reliably generate the correct delineation or curvature on the cylindrical surface of the pipe or the plane surface, which is to be intersected by the end of another pipe, simultaneously cutting the same on said line of delineation.

A further object of my invention lies in the provision of means whereby one of the adjustments, made with respect to the exact inside diameter of the intersecting pipe, and another adjustment made with respect to the outside diameter of the pipe to be intersected, results in a very arcuate single line intersection thereby facilitating strong, rapid and durable welding of the intersection.

Another object of my invention is to provide a novel mechanical means for moving and guiding the cutting torch in one continuous operation from the beginning to the end of the line of cut, whereby a smooth even cut is insured with a minimum of effort and consequent minimum use of fuel for the cutting torch.

Other objects and advantages in details of construction and operation will be apparent as the description proceeds, reference now being had to the figures of the accompanying drawings forming a part of this application and wherein like reference numerals indicate like parts.

In the drawings:

Figure 2 is a side view thereof.

Figure 3 is a top plan view thereof.

Figure 4 is a detail view illustrating the types of cuts which my invention is adapted to provide on a pipe for the various types of intersections.

Figure 5 is a detail end view illustrating one type of intersection for which my invention is useful.

Figure 1:
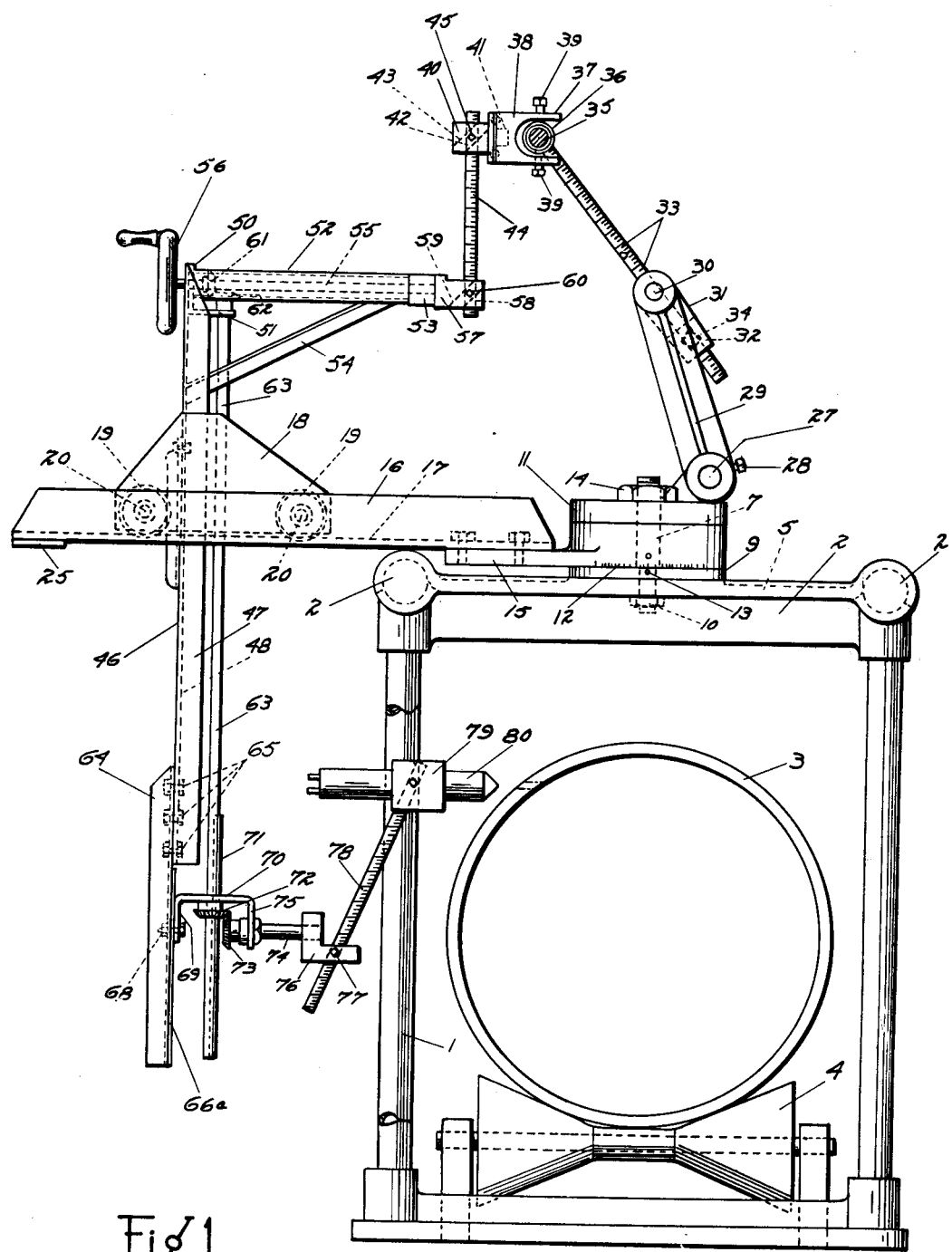
Figure 1 is an end view of my apparatus in operative position.

The reference character 1 refers to spaced parallel upright supporting members connected at their upper ends by supporting members 2 to provide an open frame into which between the end supports thereof may be disposed a pipe or other cylindrical member 3 suitably supported upon rollers 4 whereby the pipe may be easily inserted and withdrawn with respect to the frame.

Removably mounted upon the upper supporting members 2 is a support saddle 5 spanning the parallel supports 2 and provided at its ends with bent fingers 6 partially encircling the supporting rods 2.

Disposed centrally of the saddle member 5 and extending upwardly therefrom is a stud 7 shouldered adjacent its lower end as at 8, said shouldered portion resting on the upper surface of a boss 9 formed centrally of the saddle 5, thus limiting the downward movement of the stud 7. A nut 10 is threaded on the lower end of the stud 7 to rigidly hold it in position.

The stud 7 provides a pivot for a rotatable member 11, the lower surface of which rotates upon the upper surface of the boss 9 and is graduated as at 12 with respect to a zero mark 13 on said boss.

The stud 7 is provided at its upper projecting end with a lock nut 14 which serves to permit adjustment of the member 11 and hold it in its adjusted position.

This adjustable member 11 is provided adjacent one edge with a lateral extension 15 bolted or otherwise secured to which are a pair of parallel outwardly extending rail members preferably in the form of angle members provided with the vertical flanges 16 and the horizontal inwardly extending flanges 17. These rail members form tracks for a slidable carriage comprising essentially the spaced parallel side plates 18 supported upon the wheels 19, by means of the shafts 20 having suitable bearings in the side plates 18. Secured to each of the side plates 18, as by riveting, shown at 21 in Figure 3, are vertically disposed angle plates 22, the inwardly extending flanges 23 of which are provided with vertical elongated slots 24 (see Figure 2) for a purpose to be described.

The outer extending ends of the rail members 16—17 are secured together in proper spaced parallel relation by means of a crosspiece 25.

Provided on the upper surface of the rotatable member 11 is a fixed bearing 26 through which extends a rod or bar 27 adapted to be fixed in desired position in the bearing by means of the set screws 28. The opposite extending ends of the bar 27 carry forwardly and upwardly extending arms 29, such arms being rigidly fixed with respect to the bar 27. Pivotally carried by the upper extending ends of the arms 29, as by the pins 30 are link members 31 provided at their free ends with bearings 32 adapted to slidably receive graduated rods 33 which rods are adapted to be secured in their adjusted positions in the bearings 32 by means of the set screws 34. The opposite ends of the rods 33 are rigidly connected by a beam 35 rigidly secured to such ends.

Slidable upon the beam 35 is a sleeve 36 and embracing the sleeve 36 are the bifurcated ends 37 of a collar 38 secured to the sleeve as by the set screws 39. This collar 38 is thus pivotally and slidably mounted upon the beam 35.

The opposite end of the collar 38 is provided with a swivelled block 40 pivoted to the collar 38 as at 41. This block 40 is provided with two openings extending through the block, one opening 42 extending squarely through the block at right angles and the other opening 43 disposed angularly through the block at an angle of 45 degrees for a purpose to be described.

This block 40 is adapted to receive in one of its openings one end of a graduated rod 44 which may be adjustably secured in the block by means of the bolt 45.

Vertically disposed with respect to the carriage 18 and slidably adjustable vertically therethrough is a mast indicated in Figure 1 generally as 46. This mast comprises a pair of spaced parallel angle bars having the flanges 47 and 48 secured together and held in spaced parallel relation by any suitable means. This mast is adapted to be adjusted vertically between the rails 16 of the carriage, the ends of the mast extending upwardly and downwardly beyond said carriage. The flanges 48 of the mast frame are disposed directly adjacent and in contact with the flanges 23 of the angle members carried by the carriage side frames 18 and are provided with suitable openings through which pass bolts 49 as clearly shown in Figure 2, which bolts also pass through the slots 24 in the flanges 23. The mast is thus slidably and vertically guided with respect to the carriage and may be locked in any adjusted position by means of the bolts 49.

The upper ends of the mast frame members are connected by means of an angle bracket having the vertical flange 50 and the horizontal flange 51. Secured to the vertical flange 50 of this angle bracket and extending forwardly therefrom are a pair of angle members 52 connected at their opposite ends by means of a block 53. A brace member 54 extends between the mast member and the outer end of this housing member 52 whereby the same is rigidly supported upon the mast. A shaft 55 is journaled at one end in the vertical flange 50 of the angle bracket and extends through the housing members 52 and is journaled at its opposite end in the block 53. A hand wheel 56 is provided on the extending shaft 55 whereby the same may be rotated. Secured to the opposite end of the shaft 55 is a block 57 provided with a pair of openings therethrough, the opening 58 passing through the block at right angles thereto and the other opening 59 passing through the block at a 45 degree angle for a purpose to be described. The lower end of the graduated rod 44 is adjustably secured in one of the openings provided in this block 57 and may be secured in its adjusted position by means of the set screw 60. Obviously, therefore, from the foregoing description it will be clear that rotation of the hand wheel 56 and the shaft 55, will result in rotation of the block 57 and the rod 44.

Fixed to the outer end of the shaft 55 is a miter gear 61 meshing with a miter gear 62 journaled on the horizontal flange 51 of the angle bracket. This miter gear 62 is secured on the upper end of a vertically disposed shaft 63 which extends downwardly parallel with the mast 46 to a point adjacent the lower end of the supporting frame 1—2.

The lower end of the mast 46 has secured thereto an extension member comprising angle members 64 secured to the mast as by the bolts 65 (see Figure 1.) The horizontal flanges 66 of these angle extensions are connected by a plate 66a which plate is provided with elongated slots 67 through which are adapted to pass bolts 68, which bolts also pass through openings in the flange 69 of a bracket 70 whereby said bracket is vertically adjustably secured to the extension.

The lower end of the shaft 63 passes through a suitable opening in the bracket 70 and is provided with an elongated key 71. Slidable upon the lower end of the shaft 63 but rotatable therewith by virtue of the key 71 is a miter gear 72 meshing with a miter gear 73 on a stub shaft 74 journaled at one end in the flange 75 of the bracket 70. The opposite end of this stub shaft 74 carries a block 76 adjustably secured to which by means of the set screw 77 is a rod 78 carrying at its opposite end a bracket 79 upon which bracket is adjustably secured the cutting torch 80. Any suitable means may be provided for adjustably mounting the torch 80 on the bracket 79, such as the swivel and wing nut 81 shown clearly in Figure 2. This is to permit the torch to be positioned at any desired angle with respect to the pipe 3 during the cutting operation.

From the foregoing description it will be clear that rotation of the hand wheel 56 results in rotation of the shaft 63, the stub shaft 74 and the torch 80 with respect to the pipe 3.

The operation of my invention will now be described.

Assuming that it is desired to cut an opening in the pipe 3 which is on center with respect to said pipe and the opening to be cut is for a right angular pipe intersection as shown at A in Figure 4, the adjustable turntable 11 is turned to zero mark on the boss 9 of the saddle 5 and locked in such position by means of the nut 14. The graduated rods 33 are now adjusted in the blocks 32 of the links 31 in accordance with the outside diameter of the pipe 3. The graduated rod 44 is now adjusted in the block 40 in accordance with the inside diameter of the pipe which is to intersect the opening to be cut in the pipe 3. The mast 46 is now adjusted vertically with respect to the carriage 18 to bring the longitudinal axis of the shaft 52 in horizontal alignment with the pivot pins 30 constituting the pivotal axis of the beam 35. The mast is then secured in such position and next the graduated rod 78 which carries the torch 80, is adjusted in the block 76 to correspond with the adjustment of the graduated rod 44, so that the radius of the rotating torch 80 is the same as that of the rotating rod 44 and corresponds to the inside diameter of the pipe which is to intersect the pipe 3. The torch 80 may, of course, be adjusted to any desired angle on the bracket 79 whereby the angle of cut through the wall of the pipe 3 may be made a precise continuation of the inner circumferential surface of the intersecting pipe thereby providing a smooth, even, well matched intersection to facilitate welding.

The last adjustment necessary is that of the vertical position of the torch with respect to the pipe to be cut and depends upon the size of the pipe, assuming the pipe to always be supported by the rollers 4 within the frame. This adjustment is provided by means of the bracket 70 being vertically adjusted on the extension 64 and by virtue of the key 71 on the shaft 63. This bracket is raised or lowered which results in raising or lowering the torch in accordance with the size of pipe to be cut, it being noted here that the longitudinal axis of the stub shaft 74 is by this adjustment positioned on line with the horizontal center diameter of the pipe to be cut when the cut to be made is on center as at A in Figure 4.

The machine is now ready to operate and with the torch lighted for the cutting operation, the operator rotates the wheel 56 which results in rotation of the rod 44 and exact corresponding rotation of the torch 80 in a vertical plane. Simultaneously with the rotation of the rod 44 and torch 80 in a vertical plane, the beam 35 is by virtue of its sliding and swivelled connection to the rod 44, rocked on its pivots 30 in an arc the extent of which is determined by the length of the rod 44. Such swinging of the beam 35 causes the carriage 18 to travel inwardly and outwardly along the track 16 carrying with it, of course, during such travel the mast 46 and the torch 80. If the setting of the graduated rods 33 has been correct for the outside diameter of the pipe 3, this inward and outward movement of the torch 80 will conform exactly to the curvature of the surface of the pipe 3 as the torch moves in a circular vertical plane whereby a perfect opening on center may be cut.

If it is desired to make the cut off center on the pipe 3, that is above or below center, for an intersection as is illustrated at B in Figures 4 and 5, the same settings are necessary with respect to the rods 33, 44 and 78 controlled by the diameters of the pipes involved and the adjustment of the bracket 70 on the mast 46 for the size of the pipe and the position thereof on the rollers 4, and in addition the mast 46 is raised or lowered on the carriage 18, depending upon whether the cut is to be above or below the center line of the pipe. Assuming that the cut is to be above the center line of pipe 3 as illustrated at B in Figures 4 and 5, the mast 46 is adjusted upwardly the desired off center amount. This, of course, raises the beam 35 and of course, as it is raised it moves slightly rearwardly on its pivot 30 and brings the carriage 18 forward so that the torch 80 follows the contour of the pipe in proper spaced relation therefrom. With the mast now fixed at its proper elevated position it will be noted that the shaft 55 or axis of rotation of the rod 44 will be above the pivots 30, the axis of rotation of the beam 35. Consequently during the vertical rotary movement of the rod 44 and consequently of the torch 80, the beam 35 will be rocked on its pivot a greater amount rearwardly with respect to the pipe 3 during the upper half of the rotation of the rod 44 and torch 80 than at the lower half whereby the torch may properly follow the contour of the pipe in this off center position. The same operations, of course, take place for cutting the opening in the pipe 3 on an offset below center.

If it is desired to cut the opening in the pipe 3 at an angle to the longitudinal axis of the pipe other than the right angle above described, for instance, as illustrated at C in Figure 4, the turntable device 11 is rotated to the desired angle as indicated by the graduations 12 and locked in its properly adjusted position. The other settings and the operation of the device are made exactly in accordance with the above description and the generating operation of the device is the same except that with such adjustment of the turntable 11 and consequently the beam 35 with respect to the rod 44, results in the rod 44 instead of being vertically disposed as shown in Figure 1, assumes an angle position with respect to the beam, the angular slots 59 and 43 being provided for this purpose. This, of course, modifies the rocking movement of the beam 35 and consequently the inward and outward travel of the mast 46 and torch 80 whereby the path of the cut on the pipe 3 is modified to produce the longitudinally angular cut required. In such a cut the opening would be slightly longer longitudinally of the pipe than is the case where the opening is cut at right angles thereto.

Obviously from the foregoing description the angular cut longitudinally of the pipe just described can be made either on center with respect to the pipe or off center as desired, the adjustments for these operations having been previously explained.

As stated previously in this description, this apparatus is adaptable also for cutting openings in plane surfaces to receive the ends of intersecting pipes at right angles thereto and when so used, it will, of course, be understood that the plane surface will be suitably positioned with respect to the cutting torch 80 and that inasmuch as the surface to be cut is flat, the rod 44 may be disconnected from the beam 35 as the in and out movement of the beam controlling the in and out movement of the torch is unnecessary. Otherwise the adjustments and operations are identical with those just described.

Of course, changes may be made in details of construction and operation without departing from the spirit and scope of my invention. I do not limit myself, therefore, to the exact form herein shown and described other than by the appended claims.

I claim:

1. A cutting apparatus for forming cylindrical surfaces for intersecting cylinders comprising a cutting torch, a movable holder for said torch adapted to rotate said torch on an axis at an angle to the longitudinal axis of the cylinder, a carriage upon which said holder is supported, said carriage and holder being movable longitudinally of the axis of rotation of said holder simultaneously with the rotation of said holder and to a predetermined extent whereby said torch generates and cuts the surface on a predetermined line.

2. A cutting apparatus for forming cylindrical surfaces for intersecting cylinders comprising a cutting torch, a movable holder for said torch adapted to rotate said torch on an axis at an angle to the longitudinal axis of the cylinder, a carriage upon which said holder is supported, said carriage and holder being movable longitudinally of the axis of rotation of said holder simultaneously with the rotation of said holder and to a predetermined extent whereby said torch generates and cuts the surface on a predetermined line, and a single operating means for causing the movements of said carriage and holder.

3. A cutting apparatus for forming cylindrical surfaces for intersecting cylinders comprising a cutting torch, a movable holder for said torch adapted to rotate said torch on an axis at an angle to the longitudinal axis of the cylinder, a carriage upon which said holder is supported, said carriage and holder being movable longitudinally of the axis of rotation of said holder simultaneously with the rotation of said holder and to a predetermined extent whereby said torch generates and cuts the surface on a predetermined line, and adjustable means on said carriage for conforming the generated line of cutting to the size of the cylinder being cut.

4. A cutting apparatus for forming cylindrical surfaces for intersecting cylinders comprising a cutting torch, a movable holder for said torch adapted to rotate said torch on an axis at an angle to the longitudinal axis of the cylinder, a carriage upon which said holder is supported, and means including a swingable beam connected with said carriage for moving said carriage and holder longitudinally of the axis of rotation of said holder simultaneously with the rotation of said holder and to a predetermined extent whereby said torch generates and cuts the surface on a required line.

5. A cutting apparatus for forming cylindrical surfaces for intersecting cylinders comprising a cutting torch, a movable holder for said torch adapted to rotate said torch on an axis at an angle to the longitudinal axis of the cylinder, a carriage upon which said holder is supported, means including a swingable beam connected with said carriage for moving said carriage and holder longitudinally of the axis of rotation of said holder simultaneously with the rotation of said holder and to a predetermined extent whereby said torch generates and cuts the surface on a required line, and means for so adjusting the lateral position of said beam with respect to the cylinder that the movement of said carriage is modified to generate a line of cut at an angle to the longitudinal axis of the cylinder.

6. A cutting apparatus for forming cylindrical surfaces for intersecting cylinders comprising a cutting torch, a movable holder for said torch adapted to rotate said torch on an axis at an angle to the longitudinal axis of the cylinder, a carriage upon which said holder is supported, means including a swingable beam connected with said carriage for moving said carriage and holder longitudinally of the axis of rotation of said holder simultaneously with the rotation of said holder and to a predetermined extent whereby said torch generates and cuts the surface on a required line, means for so adjusting the lateral position of said beam with respect to the cylinder that the movement of said carriage is modified to generate a line of cut at an angle to the longitudinal axis of the cylinder, and means for so adjusting the axis of rotation of said holder with respect to the cylinder that the generated line of cut is selectively above or below the horizontal center line of the cylinder.

7. In pipe cutting apparatus the combination of an operating shaft, means for supporting a pipe section with its longitudinal axis in the plane of the axis of rotation of the shaft, a cutting torch in offset arrangement on said shaft and mechanism for rotating the shaft about its axis and imparting longitudinal movement thereto.

In testimony whereof, I affix my signature.
DWIGHT GERBER.